(12) United States Patent
Yoshida et al.

(10) Patent No.: US 8,137,010 B2
(45) Date of Patent: Mar. 20, 2012

(54) IMAGING DEVICE

(75) Inventors: Takeshi Yoshida, Nagoya (JP); Hiroshi Yamakose, Gifu (JP); Kenichi Maruyama, Okazaki (JP); Tetsuro Kato, Nagoya (JP)

(73) Assignee: Elmo Company, Limited (JP)

( * ) Notice: Subject to any disclaimer, the term of this patent is extended or adjusted under 35 U.S.C. 154(b) by 0 days.

(21) Appl. No.: 12/643,474

(22) Filed: Dec. 21, 2009

(65) Prior Publication Data
US 2010/0189430 A1 Jul. 29, 2010

(30) Foreign Application Priority Data
Jan. 29, 2009 (JP) .................................. 2009-18022

(51) Int. Cl.
*G03B 17/00* (2006.01)
(52) U.S. Cl. ...................................................... 396/428
(58) Field of Classification Search .................. 396/419, 396/428, 430; 348/373–376; 248/184.1, 248/364.01
See application file for complete search history.

(56) References Cited

U.S. PATENT DOCUMENTS 5,933,191 A * 8/1999 Ariga et al. .................... 348/373
7,899,310 B2 * 3/2011 Hsieh et al. ....................... 396/5
2009/0002548 A1 * 1/2009 Liang et al. .................... 348/373

FOREIGN PATENT DOCUMENTS

JP 2007-194884 A 8/2007
* cited by examiner

*Primary Examiner* — W. B. Perkey
*Assistant Examiner* — Minh Phan
(74) *Attorney, Agent, or Firm* — Ostrolenk Faber LLP

(57) ABSTRACT

In an imaging device 100, as a base 110 is moved from a certain position on an upper side of an imaging area SA to a different position on a left side of the imaging area SA, a camera head 150 is pivotally rotated together with a head-side arm 160 relative to a second arm 132. Such combination of the movement of the base 110 with the pivotal rotation of the camera head 150 changes the operation mode of the imaging device 100 from a first working mode to a second working mode and enables the imaging device 100 to take images in the second working mode. Regardless of the positional change of the base 110 from the position on the upper side of the imaging area SA to the position on the left side of the imaging area SA with the change of the operation mode of the imaging device 100 from the first working mode to the second working mode, an up-down positional relation in an imaging view field of an internal camera, which is incorporated in the camera head 150 and is operated to shoot downward and take an image of a shooting object sheet ST set in the imaging area SA, is kept unchanged relative to the shooting object sheet ST.

5 Claims, 5 Drawing Sheets

IMAGING DEVICE

CROSS-REFERENCE TO RELATED APPLICATIONS

The present application claims the priority based on Japanese Patent Application No. 2009-18022 filed on Jan. 29, 2009, the disclosure of which is hereby incorporated by reference in its entirety.

BACKGROUND

1. Technical Field

The present invention relates to an imaging device configured to point an internal camera incorporated in a camera head toward a subject set in an imaging area and take an image of the subject.

2. Related Art

These imaging devices are roughly classified into two groups having different structures, one structure equipped with a stage for holding a subject mounted thereon and the other structure without such a stage. Various arrangements and applications have been proposed for the latter structure, because of its advantages, the small size, the light weight, and the easiness of handling (see, for example, JP-A-2007-194884).

In the prior art imaging device disclosed in the above cited reference, a subject is placed on an upper surface of, for example, a table or a disk, and a camera head is extended from a base located on a lateral side of an imaging area and is held over the imaging area by means of an arm structure. While images of the subject are taken with an internal camera incorporated in the camera head held over the imaging area, the imaging point may be changed by moving the subject according to the requirements. For example, there may be a desire to change the imaging point from a central area of the subject to any of upper and lower end areas and lateral side areas of the subject. Such a change of the imaging point requires a vertical sliding motion (upward or downward) of the subject or a horizontal sliding motion (leftward or rightward) of the subject. The imaging area of the camera may be narrower than the surface area of a subject, such as a large-size sheet or a long sheet. In this case, there is similarly a requirement for the vertical sliding motion (upward or downward) or the horizontal sliding motion (leftward or rightward) of the subject.

In one example, a certain subject, etc, a sheet, having substantially similar dimensions to those of the imaging area of the camera may be placed on the upper surface of the table or the disk, and the base may be located on an upper side of the sheet. The imaging area of the camera head held on the base by the arm structure covers the whole area of the sheet. The imaging point is then set on the center of the sheet. In this state, the base is located neither on the left side of the sheet nor on the right side of the sheet. This arrangement allows for the horizontal sliding motion (leftward or rightward) of the sheet to change the imaging point across the left-to-right width of the sheet. The positional change of the imaging point from the upper side to the lower side of the sheet, however, causes the sheet to interfere with the base located on the upper side of the sheet.

Such interference undesirably restricts the vertical sliding motion of the sheet (upward or downward) and limits the coverage of the imaging area in the vertical direction. When the base is located on the left side or on the right side of the sheet, on the other hand, the sheet is slidable in the vertical direction (upward or downward) without interfering with the base. While enabling the imaging point to be changed across the top-to-bottom length of the sheet, this arrangement undesirably restricts the horizontal sliding motion of the sheet (leftward or rightward) and limits the coverage of the imaging area in the horizontal direction. This discussion is similarly applicable to the case of taking images of a large-size sheet or a long sheet.

SUMMARY

In order to solve one or more the problems of the prior art technique discussed above, there would be a requirement for enhancing the convenience and improving the usability of an imaging device for taking images configured to cause a camera head to be held, by means of an arm structure, on a base located at a position that avoids interfering with the imaging area. The present invention accomplishes at least part of the requirement mentioned above and the other relevant requirements by an imaging device having any of various configurations and arrangements discussed below.

One aspect of the invention is directed to an imaging device configured to point an internal camera incorporated in a camera head toward an imaging area and take an image of a subject set in the imaging area. The imaging device has a base located at a certain position that avoids interfering with the imaging area. The imaging device also includes a base-side arm structured to rise substantially upright from the base and to be extended from a side of the base over the imaging area, and a head-side arm extended from the camera head to be transversely to an optical axis of the camera. The imaging device further has a head support assembly configured to support the camera head on the base-side arm via the head-side arm, such that an up-down positional relation in an imaging view field of the camera is kept unchanged relative to the subject set in the imaging area, regardless of a positional change of the base from the certain position to a different position that avoids interfering with the imaging area.

In the imaging device according to this aspect of the invention, the base-side arm is structured to rise substantially upright from the base located at the certain position that avoids interfering with the imaging area. The camera head is supported via the head-side arm on the base-side arm, which is extended over the imaging area, by means of the head support assembly. The internal camera incorporated in the camera head is thus pointed downward to the imaging area and is operated to shoot downward and take an image of the subject set in the imaging area. In the imaging device of this configuration, the up-down positional relation in the imaging view field of the camera, which is operated to shoot downward and take an image of the subject set in the imaging area, is kept unchanged relative to the subject set in the imaging area, regardless of the positional change of the base from the certain position to the different position that avoids interfering with the imaging area. For example, the up-down positional relation in the imaging view field of the camera relative to the subject set in the imaging area is kept unchanged, even when the base is moved from one position on an upper side of the imaging area to another position on a lateral side of the imaging area. An upward sliding motion of the subject set in the imaging area toward the upper end of the imaging area may be restricted, due to the presence of the base located on the upper side of the imaging area. As the base is moved from the position on the upper side of the imaging area to another position on the lateral side of the imaging area, the upward sliding motion of the subject set in the imaging area is enabled, due to the absence of the base on the upper side of the imaging area.

The up-down positional relation in the imaging view filed of the camera relative to the subject set in the imaging area is kept unchanged, regardless of such a positional change of the base. The direct output of imaging signals representing images taken with the camera accordingly does not change the vertical relation of the taken images. Namely the imaging device according to this aspect of the invention does not require any additional image processing, for example, rotational adjustment of the image signals. The imaging device of this configuration is thus capable of arbitrarily changing the imaging point and varying the coverage of the imaging area to shoot downward and take an image of the subject set in the imaging area with the internal camera. This arrangement assures the enhanced convenience and the improved usability of the imaging device. The non-requirement of any additional image processing desirably simplifies the structure of the control circuitry and equipment.

The imaging device according to the above aspect of the invention may be designed to have various additional structures or arrangements. In one preferable application of the imaging device according to the invention, the base-side arm includes a first arm structured to rise substantially upright from the base, and a second arm supported in a pivotally rotatable manner on the first arm to change a geometrical configuration between a folding configuration to be folded back on the first arm and an extending configuration to be extended over the imaging area. The head support assembly has an arm support shaft provided on one end of the second arm in the extending configuration to be extended over the imaging area and configured to support the head-side arm in a pivotally rotatable manner relative to the second arm. In the imaging device of this application, the camera head is pivotally rotatable together with the head-side arm about the arm support shaft relative to the second arm in the extending configuration to be extended over the imaging area. As the base is moved to change its position on the periphery of the imaging area, the camera head is pivotally rotated together with the head-side arm about the arm support shaft by a rotation amount corresponding to the positional change of the base. The combination of the positional change of the base with the pivotal rotation of the camera head effectively keeps the up-down positional relation in the imaging view field of the camera unchanged relative to the subject set in the imaging area.

In the state where the base is located on the upper side of the imaging area, the second arm located over the imaging area is extended from the side of the base toward the lower end of the imaging area. The head-side arm with the camera head may be arranged to be substantially perpendicular to the second arm. In this state, the upward sliding motion of the subject set in the imaging area toward the upper end of the imaging area is restricted as mentioned previously. As the base is moved from the position on the upper side of the imaging area to another position on one lateral side of the imaging area, the second arm located over the imaging area is extended from the side of the base toward an opposed lateral side of the imaging area. In this state, the camera head may be rotated by 90 degrees to make the head-side arm aligned with the second arm. The up-down positional relation in the imaging view field of the camera is then kept unchanged relative to the subject set in the imaging area, regardless of the positional change of the base from the position on the upper side of the imaging area to the position on the lateral side of the imaging area. There is accordingly no restriction on the upward sliding motion of the subject set in the imaging area toward the upper end of the imaging area. The distance between the internal camera incorporated in the camera head and the base is elongated, since the head-side arm is extended from the side of the base toward the opposed lateral side of the imaging area to be aligned with the second arm. In the imaging device of this application, the allowable range for the sliding motion of the subject in the horizontal direction (leftward or rightward) is expanded by the increased distance between the subject and the base located on the lateral side of the base. This arrangement accordingly assures the enhanced convenience and the improved usability of the imaging device.

In a non-use condition of the imaging device, the head-side arm is pivotally rotated about the arm support shaft to be folded back on the upper face of the second arm. The second arm is then pivotally rotated to be folded back on the first arm structured to rise substantially upright from the base. Such folding configuration of the multiple arms effectively saves the space in the non-use condition of the imaging device.

In one preferable embodiment of the invention, the imaging device of the above application adjusts a frictional force generated during pivotal rotation of the camera head together with the head-side arm about the arm support shaft and applies the adjusted frictional force onto the head-side arm, thus keeping the camera head with the head-side arm at a geometrical position specified by the pivotal rotation. This arrangement enables the camera head to be kept at the geometrical position specified by the pivotal rotation without changing the positional relation of the camera head relative to the base, regardless of the positional change of the base on the periphery of the imaging area.

DESCRIPTION OF THE PREFERRED EMBODIMENTS

Figure 1:
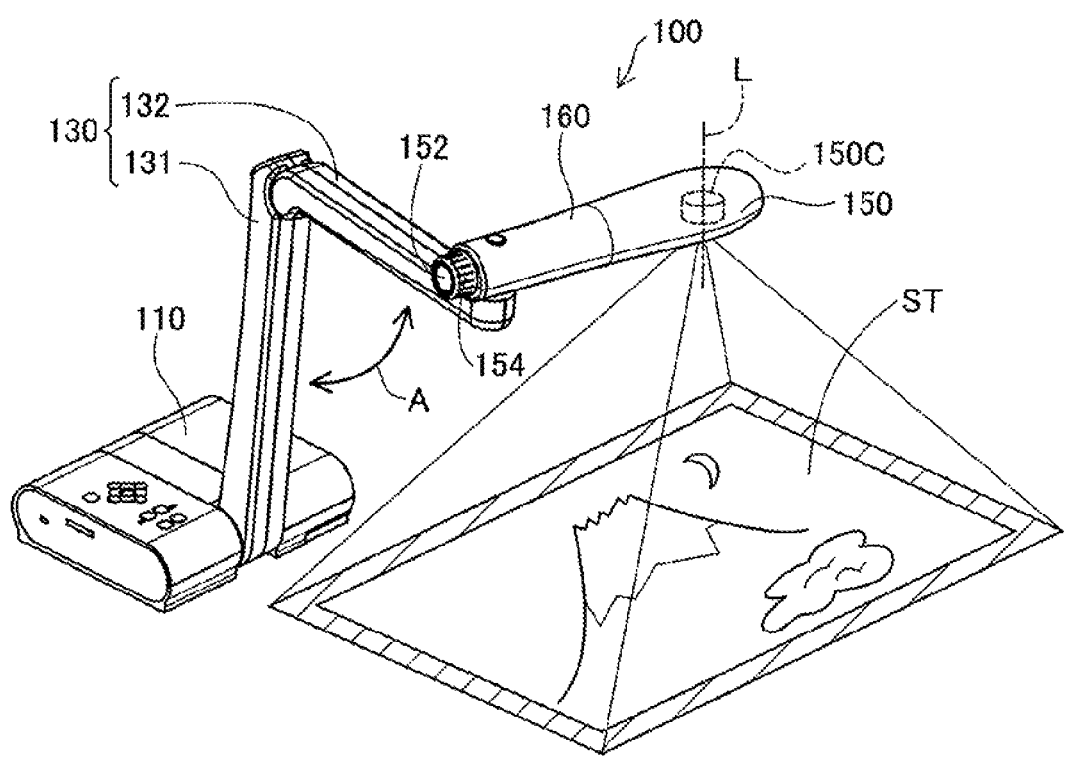
FIG. 1 is a perspective view illustrating an imaging device 100 in a first working mode in accordance with one embodiment of the invention.
Figure 2:
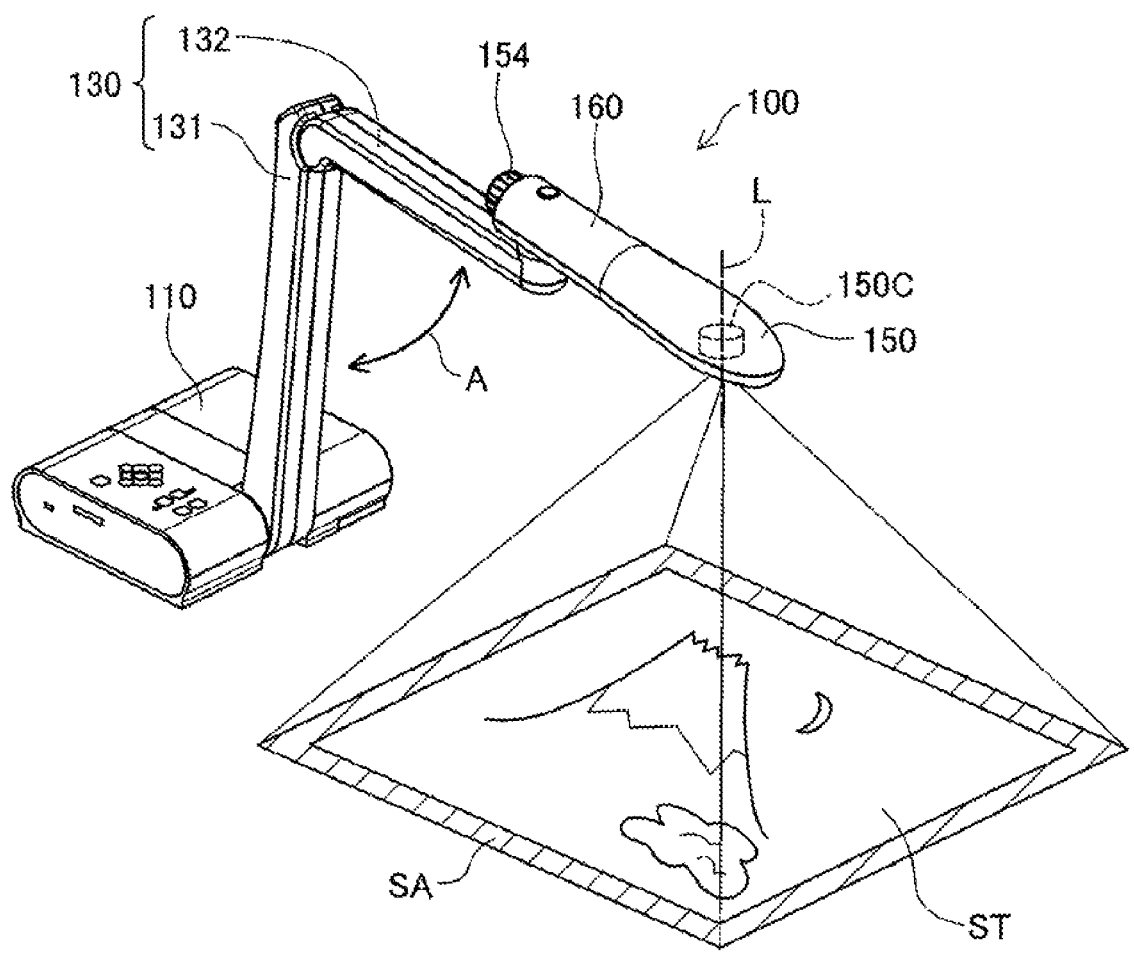
FIG. 2 is a perspective view illustrating the imaging device 100 in a second working mode.

One mode of carrying out the invention is described below as a preferred embodiment with reference to the accompanied drawings. FIG. 1 is a perspective view illustrating an imaging device 100 in a first working mode in accordance with one embodiment of the invention. FIG. 2 is a perspective view illustrating the imaging device 100 in a second working mode.

As illustrated, the imaging device 100 includes a base 110, a camera support arm 130, and a camera head 150. The base 110 is constructed as a casing of a preset weight to keep the imaging device 100 stable both in working modes with the camera head 150 extended and in a storage mode with the camera head 150 folded as discussed later. The base 110 has a set of switches including a power switch of the imaging device 100 and a mounting mechanism for a memory card. These constituents are not directly related to the subject matter of the invention and are thus not specifically described here.

The camera support arm 130 includes a first arm 131 provided on the side of the base 110 and a second arm 132 provided on the side of the camera head 150. The first arm 131 is structured to rise substantially upright from the base 110 and is fastened to the base 110. The second arm 132 is held on an upper end of the first arm 131 by means of a pivot shaft mechanism (not shown) to be pivotally rotatable in a preset vertical plane in a direction of an arrow A. Such pivotal rotation sets the geometrical configuration of the second arm 132 selected between an illustrated extending configuration to be extended substantially horizontally from the side of the base 110 over an imaging area SA (discussed below) and a folding configuration to be folded back on the first arm 131.

Figure 3:
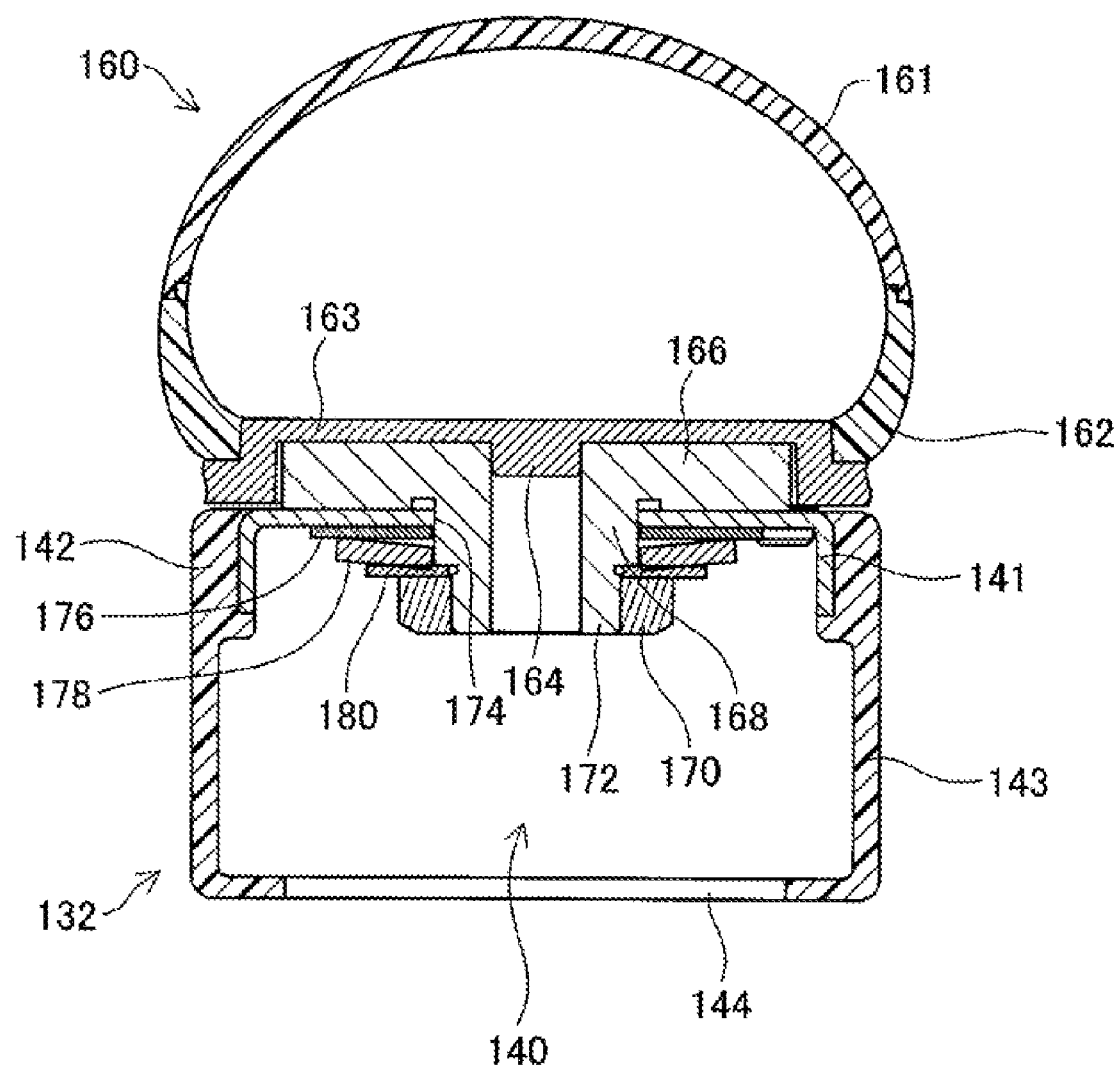
FIG. 3 is a vertical sectional view showing a camera head shaft support mechanism 140 included in the imaging device 100.

The camera head 150 includes an internal camera 150C provided on a free end thereof to take images and has a head-side arm 160 that is extended to be transverse to an optical axis L of the internal camera 150C. The internal camera 150C is constructed as an automatic focusing camera having a zooming function. The camera head 150 has an automatic focus button 152 and a zoom dial 154 provided on one end of the head-side arm 160. The zoom dial 154 is arranged to surround the automatic focus button 152 and is set to the user's desired zooming rate in response to the user's rotational operations in both directions. The automatic focus button 152 is constructed as a pressure switch and is ordinarily set in an automatic focusing function-off state. The user's pressing operation of the automatic focus button 152 activates an automatic focusing function. The head-side arm 160 with the camera head 150 is held on the upper face at one end of the second arm 132 set in the extending configuration to be extended over the imaging area SA) as shown in FIG. 1 or FIG. 2. FIG. 3 is a vertical sectional view showing a camera head shaft support mechanism 140 included in the imaging device 100.

As illustrated, the camera head shaft support mechanism 140 is interposed between the head-side arm 160 and the second arm 132 and includes an arm-side plate 141 located on the side of the second arm 132. The second arm 132 has split covers 142 and 143 that are split along a vertical axis as left and right sections and are joined with each other. The arm-side plate 141 is fastened to upper ends of both the covers 142 and 143. The head-side arm 160 has an upper cover 161 and a lower cover 162 that are split along a horizontal axis as upper and lower sections and are joined with each other. A supplemental pivotal rotation part 163 is fastened to a lower end of the lower cover 162. The supplemental pivotal rotation part 163 has a pin boss 164 on its center. A support shaft member 166 is positioned relative to the pin boss 164 and is fastened to the pin boss 164 by means of a bolt (not shown). The support shaft member 166 has a salient shaft 168 provided on its center. One end of the salient shaft 168 is formed as a threaded shaft 172 that is screwed to a nut 170. The salient shaft 168 of the support shaft member 166 is set in a support aperture 174 formed in the arm-side plate 141 and is fastened to the arm-side plate 141 with the nut 170 via a plain washer 176, a disc spring 178, and a plain washer 180. The head-side arm 160 is thus supported in a pivotally rotatable manner on the second arm 132 by means of the salient shaft 168 of the support shaft member 166. An opening 144 is formed in a lower end of the second arm 132 to be accessible for placing the plain washer 176 and the disc spring 178 and clamping the nut 170.

In the camera head shaft support mechanism 140 of this configuration, regulation of a deflection margin of the disc spring 178 with the nut 170 results in adjusting the frictional force generated in the course of rotation of the salient shaft 168 in the support aperture 174 of the frictional force generated in the course of rotation of the camera head 150 together with the head-side arm 160. Application of a force against the adjusted frictional force onto the camera head 150 causes the camera head 150 to be rotated with the head-side arm 160 on the upper face at the end of the second arm 132. The camera head 150 remains at a specific position, where the force against the frictional force is released, to be held relative to the second arm 132. In the structure of this embodiment, the camera head shaft support mechanism 140 has a clicking mechanism (not shown) to set the geometrical position of the camera head 150 relative to the second arm 132 by every 90 degrees. The clicking mechanism gives click sounds to the user rotating the camera head 150 at four different geometrical positions, the position of the camera head 150 shown in FIG. 1, the position of the camera head 150 shown in FIG. 2, a 180-degree turned position from the position of FIG. 1, and a 180-degree turned position from the position of FIG. 2. When sensing a click, the user stops further pivotal rotation of the camera head 150 but locates the camera head 150 at the user's desired position selected among the four geometrical positions. The camera head 150 is then kept and held at the selected geometrical position by the camera head shaft support mechanism 140.

In the imaging device 100 of the embodiment structured as discussed above, the camera head 150 is rotated and held by the camera head shaft support mechanism 140 to be set either in the first working mode shown in FIG. 1 or in the second working mode shown in FIG. 2. FIG. 4 is explanatory views showing a configuration change of the imaging device 100 between the first working mode and the second working mode, in relation to the up-down positional relation in the imaging view field of the internal camera 150C.

Figure 4A:
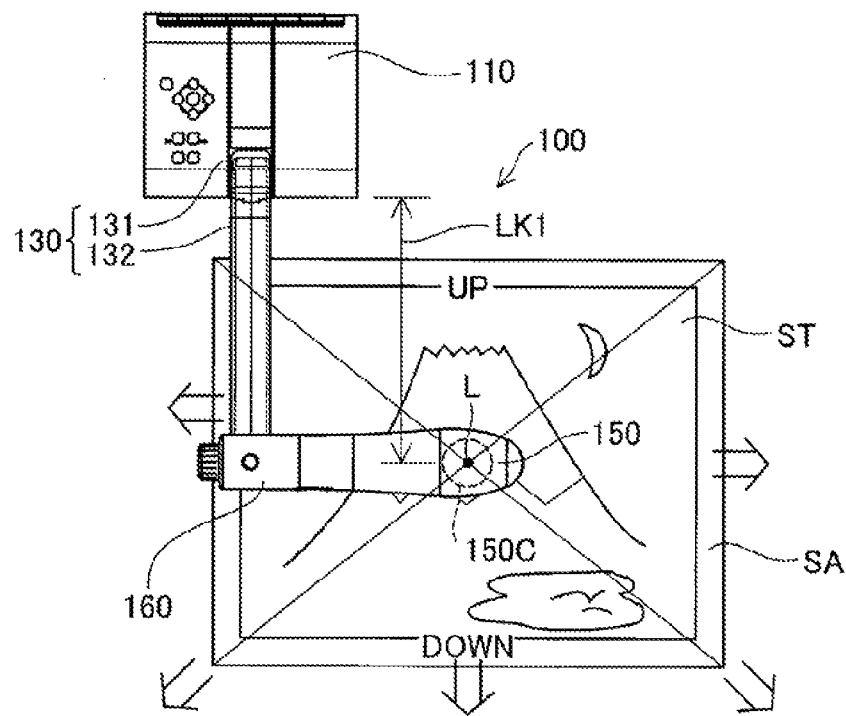
FIG. 4A is an explanatory view showing the imaging device 100 configured in the first working mode, in relation to the up-down positional relation in an imaging view field of a camera.

In the first working mode of FIG. 4(A), the head-side arm 160 with the camera head 150 is pointed rightward to be arranged substantially perpendicular to the second arm 132, which is extended substantially horizontally from the side of the base 110 over the imaging area SA. The internal camera incorporated in the camera head 150 is operated to take an image in the imaging area SA centered at the optical axis L. As illustrated, in the first working mode, the base 110 is located on an upper side of the imaging area SA. The up-down positional relation in the imaging view field of the internal camera 150C is identical with the vertical positional relation of a design pattern of a shooting object sheet ST included in the imaging area SA. In this state, a distance LK1 between a specified position of the base 110, for example, a front end of the base 110, and the optical axis L of the camera head 150 is longer than half the length of the imaging area SA in the vertical direction. The longitudinal dimension of the second arm 132 is determined to allow for the distance LK1. In this first working mode, the imaging point is changeable, as the shooting object sheet ST is slid downward, leftward, rightward, left oblique downward, and right oblique downward, in order to avoid the interference with the base 110 located on the upper side of the imaging area SA. This discussion is similarly applicable to another example of the shooting object sheet ST that is a vertically long sheet.

Figure 4B:
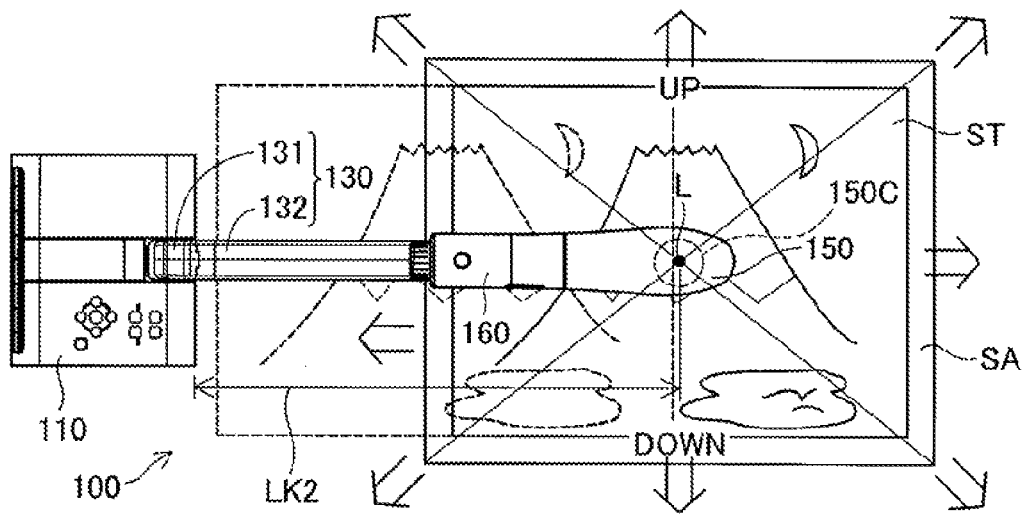
FIG. 4B is an explanatory view showing the imaging device 100 configured in the second working mode, in relation to the up-down positional relation in an imaging view field of a camera.

In the second working mode of FIG. 4(B), the head-side arm 160 with the camera head 150 is pointed rightward to be substantially aligned with the second arm 132, which is extended substantially horizontally from the side of the base 110 over the imaging area SA. The internal camera of the camera head 150 is operated to take an image in the imaging area SA centered at the optical axis L. As illustrated, in the second working mode, the base 110 is located on a left side of the imaging area SA. In this state, there is no positional change of the camera head 150 relative to the imaging area SA or the shooting object sheet ST. As in the first working mode explained above, the up-down positional relation in the imaging view field of the internal camera 150C is thus identical with the vertical positional relation of the design pattern of the shooting object sheet ST included in the imaging area SA. In this state, a distance LK2 between the front end of the base 110 and the optical axis L of the camera head 150 is longer than the distance LK1 in the first working mode by the extension of the head-side arm 160 aligned with the second arm 132 and is almost equal to the left-to-right width of the imaging area SA. The longitudinal dimensions of the second arm 132 and the head-side arm 160 are determined to allow for the distance LK2. In this second working mode, the imaging point is changeable, as the shooting object sheet ST is slid upward, downward, rightward, right oblique upward, and right oblique downward, in order to avoid the interference with the base 110 located on the left side of the imaging area SA. The imaging point is also changeable, as the shooting object sheet ST is slid leftward, left oblique upward, and left oblique downward in an allowable range having no interference with the base 110. This explanation is similarly applicable to another example of the shooting object sheet ST that is a laterally long sheet.

In the case of a change from the first working mode to the second working mode, as the base 110 is moved from the position on the upper side of the imaging area SA to the position on the left side of the imaging area SA, the camera head 150 is pivotally rotated with the head-side arm 160 relative to the second arm 132. The combination of the movement of the base 110 with the pivotal rotation of the camera head 150 changes the operation mode of the imaging device 100 from the first working mode to the second working mode and enables the imaging device 100 to take an image in the second working mode. Regardless of the positional change of the base 110 from the position on the upper side of the imaging area SA to the position on the left side of the imaging area SA with a change of the operation mode of the imaging device 100 from the first working mode to the second working mode, the up-down positional relation in the imaging view field of the internal camera 150C, which is operated to shoot downward and take an image of the shooting object sheet ST set in the imaging area kept unchanged relative to the shooting object sheet. ST. In the first working mode shown in FIG. 4(A), the interference with the base 110 located on the upper side of the imaging area SA prevents the shooting object sheet ST from being slid upward to change the imaging point. The combination of the movement of the base 110 with the pivotal rotation of the camera head 150 to change the operation mode to the second working mode shown in FIG. 4(B), however, allows for the upward sliding motion of the shooting object sheet ST, so as to readily change the imaging point to a lower end area of the shooting object sheet ST. In this state, there is no change of the up-down positional relation in the imaging view field of the internal camera 150C relative to the shooting object sheet ST. The direct output of image signals representing images taken with the internal camera 150C accordingly does not change the vertical relation of the taken images. Namely the imaging device 100 of the embodiment does not require any additional image processing, for example, rotational adjustment of the image signals. The imaging device 100 of this configuration is thus capable of arbitrarily changing the imaging point and varying the coverage of the imaging area to shoot downward and take an image of the shooting object sheet ST set in the imaging area SA with the internal camera. This arrangement assures the enhanced convenience and the improved usability of the imaging device 100. The non-requirement of any additional image processing desirably simplifies the structure of the control circuitry and equipment.

The imaging device 100 of the embodiment can easily keep the up-down positional relation in the imaging view field of the internal camera 150C unchanged relative to the shooting object sheet ST by the simple combination of the movement of the base 110 with the pivotal rotation of the camera head 150.

In the imaging device 100 of the embodiment, the camera head 150 is supported in a pivotally rotatable manner on the upper face at one end of the second arm 132 via the head-side arm 160. This arrangement enables the distance LK2 between the front end of the base 110 and the optical axis L of the internal camera 150C to be elongated in the second working mode shown in FIG. 4(B). In the second working mode, the sliding motion of the shooting object sheet ST toward the base 110, that is, the leftward sliding motion in FIG. 4(B), is thus allowed until the shooting object sheet ST interferes with the base 110. This arrangement assures the allowable range for the leftward sliding motion of the shooting object sheet ST and thereby expands the coverage of the imaging point to the right side of the shooting object sheet ST. This arrangement assures the enhanced convenience and the improved usability of the imaging device 100. In the structure of the embodiment, the distance LK2 between the front end of the base 110 and the optical axis L of the internal camera 150C is set to be substantially equal to the left-to-right width of the imaging area SA by controlling the longitudinal dimensions of the second arm 132 and the head-side arm 160. This arrangement favorably expands the coverage of the imaging point to a further position where the optical axis L is located on the right end of the shooting object sheet ST.

Figure 5:
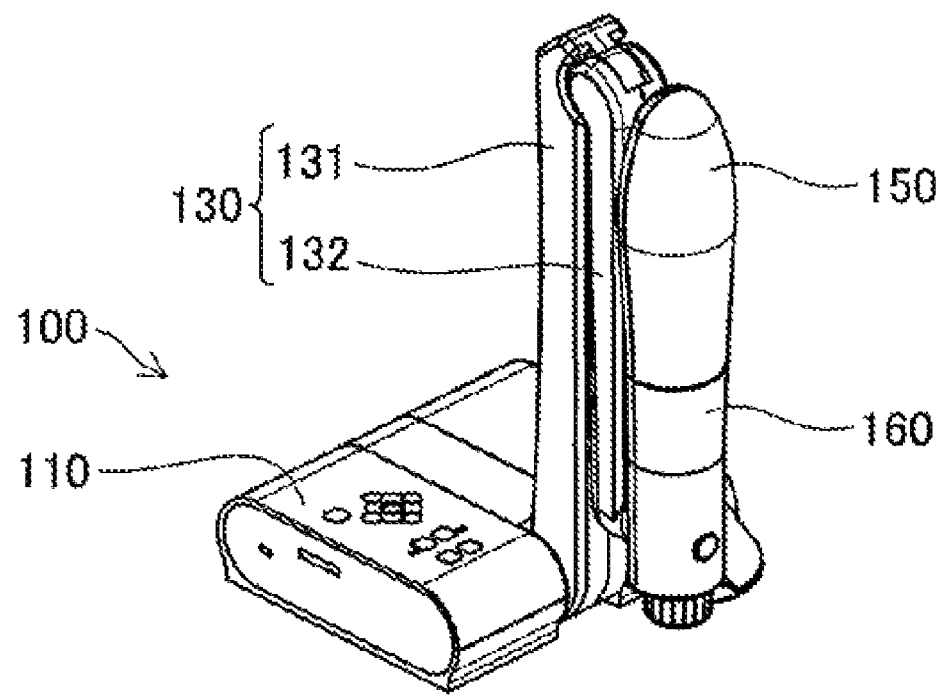
FIG. 5 is an explanatory view showing the imaging device 100 in a storage mode in a non-use condition.

The arrangement of the camera head 150 supported in the pivotally rotatable manner on the upper face at the end of the second arm 132 via the head-side arm 160 has the following advantages. FIG. 5 is an explanatory view showing the imaging device 100 in a storage mode in a non-use condition. The imaging device 100 of the embodiment allows the second arm 132 to be supported on the upper end of the first arm 131 and allows the head-side arm 160 to be supported in a pivotally rotatable manner on the upper face at the end of the second arm 132 as described above. In the non-use condition of the imaging device 100, the head-side arm 160 is rotated to be folded back on the upper face of the second arm 132 as shown in FIG. 5. The second arm 132 is then rotated to be folded back on the first arm 131 rising substantially upright from the base 110. Such folding configuration of the respective arms effectively saves the space in the non-use condition of the imaging device 100. The internal camera incorporated in the camera head 150 is covered with the second arm 132. This arrangement preferably protects the lens of the internal camera 150C from potential damages.

As the camera head 150 is pivotally rotated and held by the camera head shaft support mechanism 140 via the head-side arm 160, the frictional force is adjusted by regulating the deflection margin of the disc spring 178. This arrangement facilitates the pivotal rotation of the head-side arm 160 and the holding of the camera head 150 at a geometrical position specified by the pivotal rotation, thus assuring the enhanced convenience and the improved usability.

The embodiment and its applications discussed above are to be considered in all aspects as illustrative and not restrictive. There may be many modifications, changes, and alterations without departing from the scope or spirit of the main characteristics of the present invention. For example, the base 110 is located on the left side of the imaging area SA in the second working mode of the imaging device 100 discussed above. In one modification, the base 110 may be located on a lower side of the imaging area SA in the second working mode. Alternatively this arrangement of locating the base 110 on the lower side of the imaging area SA may be adopted as a third working mode. The up-down positional relation in the imaging view field of the internal camera 150C is kept unchanged, regardless of the change of the location of the base 110 relative to the imaging area SA with the change of the operation mode of the imaging device 100 to any of the multiple working modes, as explained previously.

In the first working mode, the camera head 150 is positioned on the right of the base 110 located on the upper side of the imaging area SA as shown in FIG. 4(A). In one modification, the camera head 150 may be positioned on the left of the base 110 in the first working mode. On the assumption that the camera head 150 is positioned on the left of the base 110 located on the upper side of the imaging area SA in the first working mode, an image output circuit should be constructed to position the internal camera of the camera head 150 opposed to the shooting object sheet ST set in the imaging area SA and keep the up-down positional relation in the imaging view field of the internal camera 150C identical with the vertical positional relation of the design pattern of the shooting object sheet ST set in the imaging area SA. The arrangement of this modification thus enables the up-down positional relation in the imaging view field of the internal camera 150C to be kept unchanged relative to the shooting object sheet ST, regardless of the positional change of the base 110 relative to the imaging area SA with the change of the operation mode of the imaging device 100 to any of the multiple working modes, the first working mode where the camera head 150 is positioned on the left of the base 110 located on the upper side of the imaging area SA, the working mode (second working mode) where the base 110 is located on the right side of the imaging area SA, and the working mode (second working mode or third working mode) where the base 110 is located on the lower side of the imaging area SA.

In the structure of the embodiment discussed above, the camera head 150 is held in a pivotally rotatable manner on the upper face at one end of the second arm 132 of the camera support arm 130 via the head-side arm 160. In one modified structure, the camera head 150 may be held in a pivotally rotatable manner on the lower face at one end of the second arm 132 via the head-side arm 150.

What is claimed is:

1. An imaging device configured to point an internal camera incorporated in a camera head toward an imaging area and take an image of a subject set in the imaging area, the imaging device comprising:
    a base located at a certain position that avoids interfering with the imaging area;
    a base-side arm structured to rise substantially upright from the base and to be extended from a side of the base over the imaging area;
    a head-side arm extended from the camera head to be transverse to an optical axis of the camera; and
    a head support assembly configured to support the camera head on the base-side arm via the head-side arm, such that an up-down positional relation in an imaging view field of the camera is kept unchanged relative to the subject set in the imaging area, regardless of a positional change of the base from the certain position to a different position that avoids interfering with the imaging area;
    wherein the base-side arm includes a first arm structured to rise substantially upright from the base, and a second arm supported in a pivotally rotatable manner on the first arm to change a geometrical configuration between a folding configuration to be folded back on the first arm and an extending configuration to be extended over the imaging area, and
    wherein the head-side arm partially overlaps the second arm to define an overlapping region, and the head support assembly has an arm support shaft provided at one end of the second arm in said overlapping region, said arm support shaft being configured to support the head-side arm in a manner pivotally rotatable relative to the second arm in a plane that is parallel to said imaging area when said second arm is disposed parallel to said imaging area.

2. The imaging device in accordance with claim 1, wherein the head support assembly has an adjustment unit configured to adjust a frictional force generated during pivotal rotation of the camera head together with the head-side arm about the arm support shaft and apply the adjusted frictional force onto the head-side arm, thus keeping the camera head with the head-side arm at a geometrical position specified by the pivotal rotation.

3. An imaging device comprising:
    an internal camera incorporated in a camera head configured to point the internal camera toward an imaging area defined in a first plane, and take an image of a subject set in the imaging area;
    a base to be located at a given position outside the imaging area;
    a base-side arm structured to rise substantially upward from the base and to be extended from the base and over the imaging area, said base-side arm having at least one pivotally rotatable joint having an axis of rotation parallel to said first plane; and
    a head-side arm extended from the camera head and transverse to an optical axis of the camera, said head-side arm being connected to said base-side arm by a joint which, when extended, is pivotally rotatable about an axis of rotation transverse to said first plane;
    the base, the camera head, the base-side arm and the head-side arm, being thereby configured such that an up-down positional relation in an imaging view field of the camera is kept unchanged relative to the subject set in the imaging area, regardless of a positional change of the base from the given position to a different position outside the imaging area;
    wherein the base-side arm includes a first arm structured to rise substantially upward from the base, and a second arm supported in a pivotally rotatable manner on the first arm about said axis of rotation parallel to said first plane, to change a geometrical configuration between a folded configuration in which said second arm is folded back on the first arm, and an extended configuration in which said second arm is extended over the imaging area, and
    wherein the head-side arm partially overlaps the second arm to define an overlapping region, and said joint connecting said head-side arm to said base-side arm is arranged at one end of the second arm in said overlapping region, and configured to support the head-side arm in a manner pivotally rotatable relative to the second arm in a plane parallel to said imaging area when said second arm is disposed parallel to said imaging area, about said axis of rotation transverse to said first plane.

4. The imaging device in accordance with claim 3, further comprising an adjustment unit configured to adjust a frictional force generated during pivotal rotation of the camera head together with the head-side arm about the arm support shaft and to apply the adjusted frictional force onto the head-side arm, thus keeping the camera head with the head-side arm at a position specified by the pivotal rotation.

5. The imaging device in accordance with claim 3, further comprising a joint whereby said first arm is pivotally rotatably mounted on said base, said joint having an axis of rotation parallel to said first plane.

\* \* \* \* \*